A. J. CRIST.
MOTOR CAR ATTACHMENT.
APPLICATION FILED JUNE 17, 1912.

1,080,680.

Patented Dec. 9, 1913.

2 SHEETS—SHEET 2.

WITNESSES

INVENTOR
Andrew. J. Crist
his Attorney

UNITED STATES PATENT OFFICE.

ANDREW J. CRIST, OF AMORITA, OKLAHOMA.

MOTOR-CAR ATTACHMENT.

1,080,680.  Specification of Letters Patent.  Patented Dec. 9, 1913.

Application filed June 17, 1912.  Serial No. 704,230.

*To all whom it may concern:*

Be it known that I, ANDREW J. CRIST, a citizen of the United States, residing at Amorita, in the county of Alfalfa and State of Oklahoma, have invented certain new and useful Improvements in Motor-Car Attachments, of which the following is a specification, reference being had therein to the accompanying drawing.
This invention relates to a power attachment to be used in connection with an automobile, and has for its object the production of an efficient motor which may be driven by the rear wheels of an automobile.
Another object of this invention is the production of an efficient mechanism which may be operated with the rear drive wheels of an automobile, whereby power may be transported from the automobile to some place distant from the machine for driving a churn, washing machine, or any other desired device.

With these and other objects in view, this invention consists of certain novel constructions, combinations, and arrangements of parts, as will be hereinafter fully described and claimed.

Figure 1:
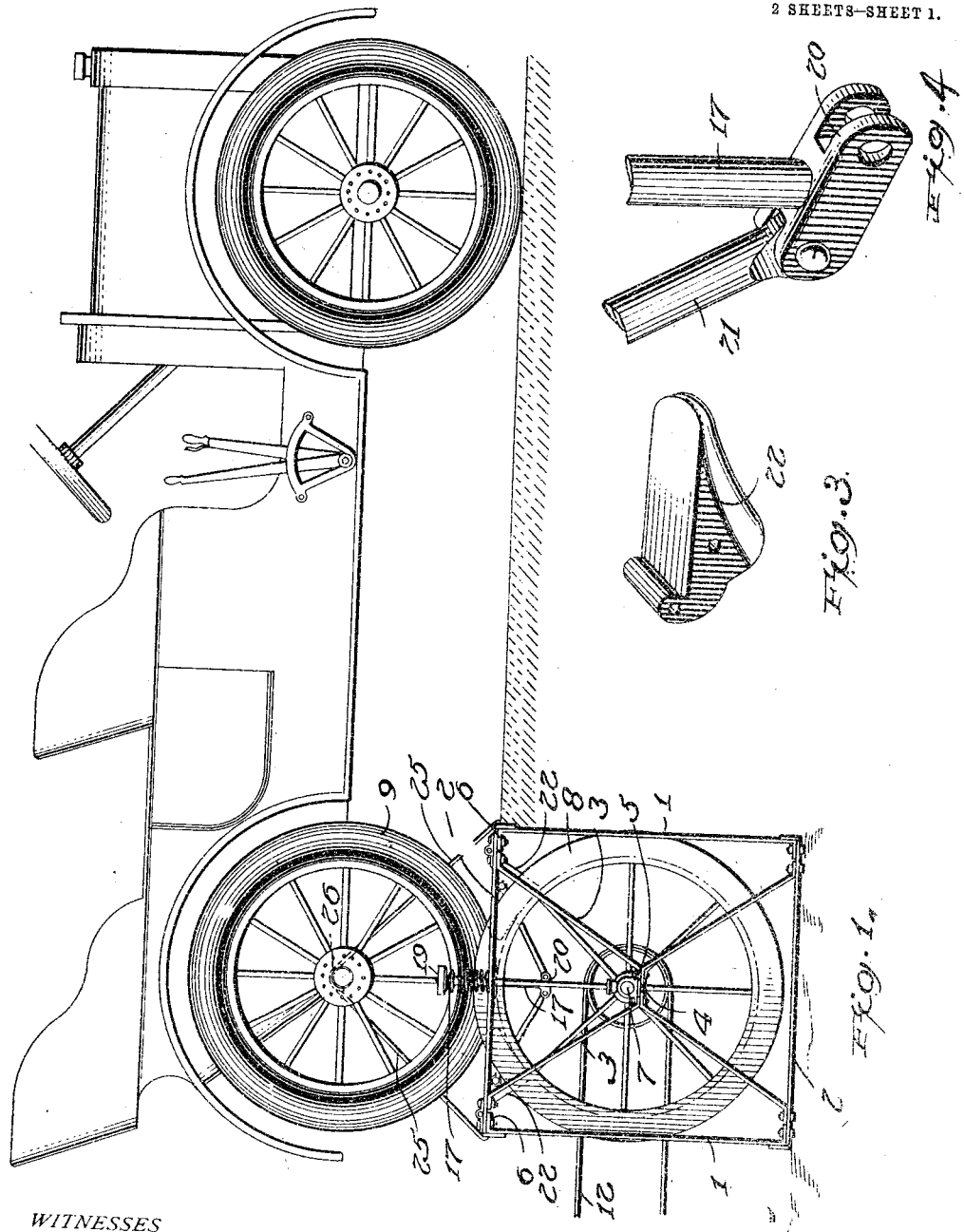
Figure 2:
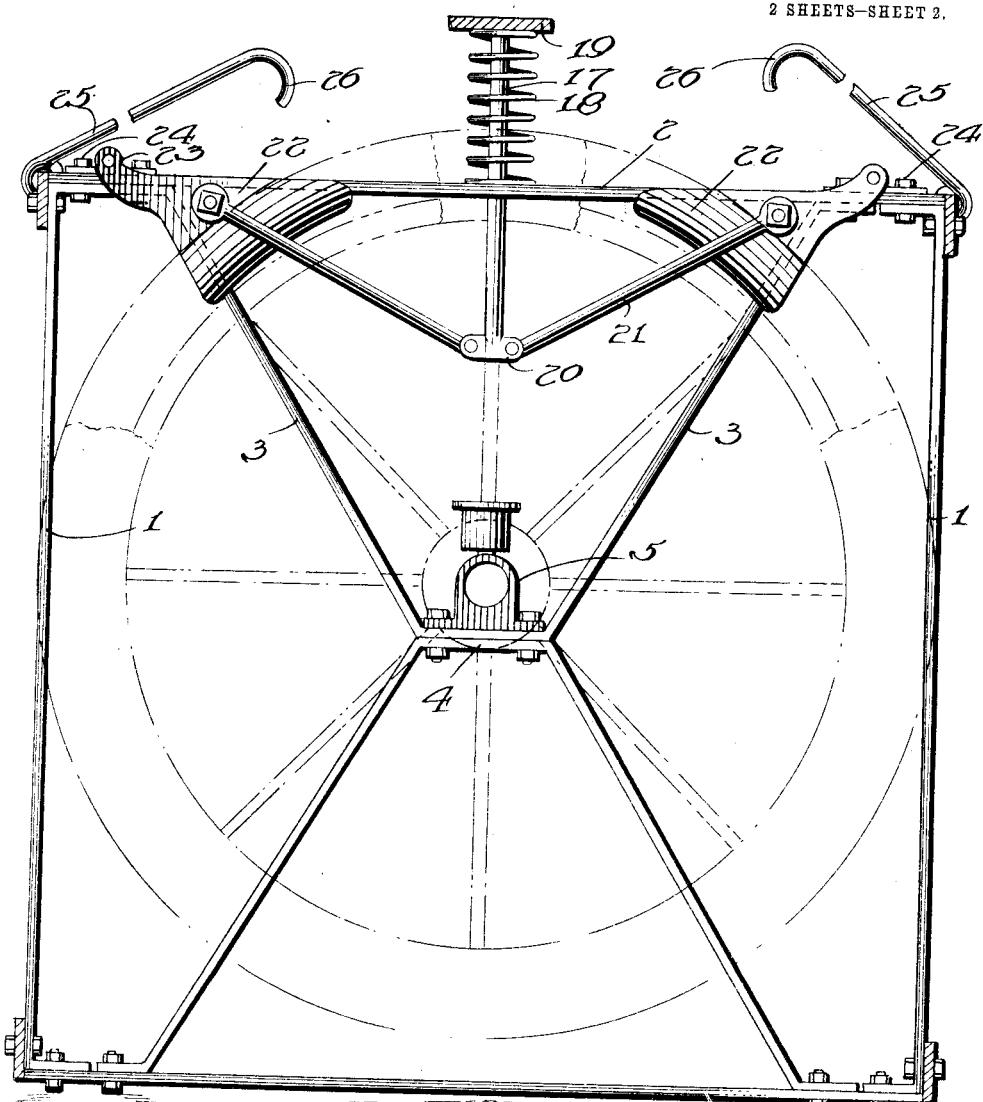
Figure 5:
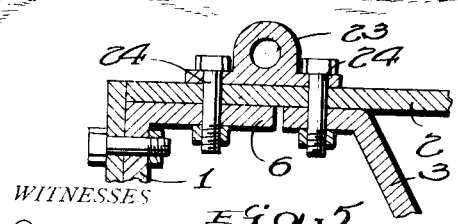
Figure 6:
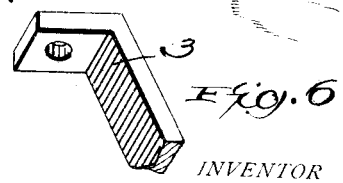

In the drawings:—Figure 1 is a side elevation of the automobile shown connected to the power attachment. Fig. 2 is an enlarged transverse section through the power attachment. Fig. 3 is a detail perspective of the brake shoe used in connection with the power attachment. Fig. 4 is a detail perspective of the lower end of the brake lever which engages the brake links for throwing the brake shoes in engagement with the driving wheels of the power attachment. Fig. 5 is an enlarged sectional view of the upper corner of the frame of the power attachment. Fig. 6 is a detail perspective of one end of the anchor brace used in connection with the frame for the power attachment.
The present invention is especially adapted for use in connection with automobiles or other motor driven vehicles, and the device is preferably carried in the floor of a garage or other automobile house, and consists of a rectangular frame formed of a plurality of vertically extending members 1 connected by means of transversely extending upper and lower braces 2. These upper and lower braces are braced by means of diagonally extending braces 3, which braces form a substantially V-shaped structure connected at their inner ends as at 4 to constitute a journal supporting portion upon which the journal 5 is mounted. The vertically extending members 1 of the frame are provided with angle feet 6 for allowing the same to be conveniently attached to the upper and lower members 2.

A central supporting shaft 7 is journaled within the journals 5, and a driving wheel 8 is carried by the shaft near each end of the frame, and in such a position as to receive the rear drive wheels 9 of an automobile. The rims of the wheel are formed concave, as indicated at 10 in Fig. 4 to receive the tires of the rear wheel of an automobile. A drive pulley 11 is carried by the end of the shaft 7, and around this pulley 11 passes a driving belt 12 which driving belt may pass to any desired place for driving a dynamo or other machine.

The main frame is provided with a pair of transversely extending portions 14, which portions are braced by means of the diagonal braces 15. A plunger 17 is carried by each of the side members 2, and this plunger is normally held in an extended position by means of a coil spring 18. A tread portion 19 is carried by the upper end of the plunger and the lower end of the plunger rod 17 is provided with a pair of laterally extending ears 20, which ears receive the ends of the operating links 21 of the brake mechanism. The opposite ends of the operating links 21 are pivotally connected to the brake shoes 22, which brake shoes are pivotally secured to the upper members 2 of the frame, by means of journals 23. These journals 23 are held in engagement with the members 2 by means of bolts 24. The under faces are so formed as to conform to the contour of the outer face of the drive wheels 8.

It will be seen that by depressing the brake operating plungers, the brake shoes 22 will be thrown so as to firmly grip the outer faces of the driving wheels 8, and thereby prevent the further rotation of the wheels after the automobile has been removed from the driving wheels 8. The automobile is braced in a firm position in engagement with the driving wheels 8, by means of bracing hooks 25, which hooks have their upper ends 26 straddling the axles of the automobile, and thereby hold the same in a steady position upon the driving wheels 8.

From the foregoing description it will be seen that a very efficient and durable power attachment has been produced upon which the automobile may efficiently act so as to impart rotary movement to the drive wheels 8, in such a manner as to drive the drive pulley 11.

The brake shoes 22 are journaled upon the journal pins 27, which pins have their inner ends secured to the journals 23 above referred to.

From the foregoing description it will be seen that a very efficient and durable device has been produced which may be shown supported within the floor of the garage or other shelter, whereby an automobile may be driven thereon so as to transmit motion to drive a generator or other device.

It will be seen that owing to the position of the brake plungers 17 that the brakes may be readily applied to the wheels 8.

What is claimed is:—

A device of the class described comprising a quadrangular frame having reinforced corners, diagonal braces anchored at their outer ends adjacent said corners, their inner ends bent to form opposing portions bolted together at the middle part of said frame, a bearing on said opposing portions, a transverse shaft in said bearing, wheels on said shaft having concave rims adapted for engagement with the tires on the wheels of an auto car, means to releasably connect said frame to the axle of said car, brake shoes pivoted near the upper corners of said frame, a hanger composed of links each having one end pivoted to a shoe and its other end pivoted to the lower end of a vertically movable rod and a spring supported tread on the upper end of said vertical rod, as specified.

In testimony whereof I hereunto affix my signature in presence of two witnesses.

ANDREW J. CRIST.

Witnesses:
 E. F. DAVIS,
 M. F. VARNUM.